United States Patent [19]

Sanchez et al.

[11] 4,387,044

[45] Jun. 7, 1983

[54] SAFE, DRY, FREE-FLOWING SOLID PEROXIDE/UNSUBSTITUTED OR ALKYL SUBSTITUTED BENZOIC ACID COMPOSITIONS

[75] Inventors: Jose Sanchez, Grand Island; Solomon C. Westbrook, Jr., Buffalo, both of N.Y.

[73] Assignee: Pennwalt Corporation, Philadelphia, Pa.

[21] Appl. No.: 308,220

[22] Filed: Oct. 5, 1981

Related U.S. Application Data

[63] Continuation-in-part of Ser. No. 66,150, Aug. 13, 1979, abandoned.

[30] Foreign Application Priority Data

Jul. 9, 1980 [CA] Canada .................................... 355772
Aug. 13, 1980 [DE] Fed. Rep. of Germany ....... 3030658

[51] Int. Cl.³ ............................................. C08F 4/34
[52] U.S. Cl. ................................... 252/426; 525/386; 525/387; 526/230; 526/230.5; 526/232; 526/231; 526/232.1
[58] Field of Search ......................... 252/426; 568/559

[56] References Cited

U.S. PATENT DOCUMENTS

| | | | |
|---|---|---|---|
| 2,453,070 | 11/1948 | Hyatt | 568/559 |
| 2,453,071 | 11/1948 | Hyatt | 568/559 |
| 3,538,011 | 11/1970 | van der Klaauw | 568/559 |
| 4,008,175 | 2/1977 | Barter | 252/426 |
| 4,092,470 | 5/1978 | Oosterwijk | 526/227 |
| 4,134,850 | 1/1979 | McCrudden | 252/186 |

*Primary Examiner*—C. A. Henderson

[57] ABSTRACT

A safe, dry and free-flowing solid peroxide/unsubstituted or alkyl substituted benzoic acid composition is prepared by mixing the solid peroxide, such as diacyl peroxide, dialkyl peroxydicarbonate, dialkyl peroxide or alkylidene diperoxide, which melts above 30° C., with solid benozic acid or an alkyl substituted benzoic acid, which melts above 40° C. This solid peroxide composition is used as an initiator for the polymerization of ethylenically unsaturated monomers, such as styrene, and for curing of unsaturated polyester resins and diethylene glycol bis(allyl carbonate). This solid peroxide composition exhibits improved safety characteristics such as delayed ignition times when in contact with a flame and increased thermal stabilities compared to similar prior art peroxide formulations.

6 Claims, No Drawings

SAFE, DRY, FREE-FLOWING SOLID PEROXIDE/UNSUBSTITUTED OR ALKYL SUBSTITUTED BENZOIC ACID COMPOSITIONS

This application is a continuation-in-part of application Ser. No. 066,150, filed Aug. 13, 1979, now abandoned.

BACKGROUND OF THE INVENTION

This invention relates to peroxide/unsubstituted or alkyl substituted benzoic acid compositions and methods of using these compositions in polymerization and crosslinking; more particularly, this invention relates to compositions of dry solid free-flowing peroxides having melting points greater than 30° C., benzoic acid or alkyl substituted benzoic acids with melting points above 40° C. and optionally a dust suppressant.

This invention also comprehends processes for polymerizing ethylenically unsaturated monomers by polymerizing said monomers in the presence of an initiating amount of the above mentioned solid peroxide composition and for curing of unsaturated polyester resins and diethylene glycol bis(allyl carbonate) monomer by crosslinking in the presence of an initiating amount of the above mentioned solid peroxide composition.

Many peroxide compositions are described in the prior art, although none of them teaches the instant invention. U.S. Pat. No. 3,538,011 describes solid, free-flowing stabilized compositions containing organic peroxides and organic fillers and the methods for the production of these compositions. Organic peroxides employed in this patent for these organic peroxide/organic filler compositions are aromatic and aliphatic diacyl peroxides, ketone peroxides and peroxyesters that are solid at room temperature whereas, the organic fillers employed are solid plasticizers that are soluble in polyester resin masses and are solid at room temperature, such as dicyclohexyl phthalate (m.p. 63°-5° C.). These organic fillers are claimed to reduce the explosiveness and the shock sensitivity of the organic peroxides employed. Nevertheless, these formulations with dibenzoyl peroxide were found to be thermally unstable stored at 70° C. relatively short time periods (see Example X, infra).

U.S. Pat. Nos. 2,453,070 and 2,453,071 disclose impact shock desensitized dibenzoyl peroxide compositions in which the preferred compositions are desensitized with 2 to 10% aliphatic carboxylic acids such as lauric acid and less preferably desensitized with 5% phthalic acid and 5% salicylic acid. 50% Dibenzoyl peroxide compositions containing aliphatic carboxylic acids such as lauric acid or other acids such as phthalic acid or salicylic acid were found to be more hazardous in burning (see Example XV, infra) and were significantly less thermally stable (see Example XVII, infra) than was an invention 50% dibenzoyl peroxide composition containing benzoic acid. In addition, this invention composition was significantly more active in curing of an unsaturated polyester resin composition than were comparable 50% dibenzoyl peroxide compositions containing salicylic acid or phthalic acid (see Example XVI, infra).

The prior art also is repleted with many peroxide paste compositions containing one or more organic safety liquids and water. Although these peroxide pastes and suspensions are described to be safe, none of them teach the safe, free-flowing solid peroxide/unsubstituted or alkyl substituted benzoic acid composition of the present invention that have been found to be significantly more permanently stable than similar prior art formulations and considerably more resistent to burning ignition. Moreover, the benzoic acid as a filler in the instant invention has no detrimental effects on the rate of solution of, or the polymerization or curing efficiency of the formulation in ethylenically unsaturated monomers, such as styrene or in unsaturated polyester resins.

STATEMENT OF THE INVENTION

This invention is directed to a safe, free-flowing solid peroxide formulation consisting essentially of 40-85% by weight of a solid peroxide having a melting point above 30° C., preferably above 40° C., 15-60% by weight of a solid unsubstituted or alkyl substituted benzoic acid having a melting point above 40° C., and 0.0 to 2.0% by weight of a dust suppressant.

DETAILED DESCRIPTION OF THE INVENTION

It has now been discovered that a free-flowing, solid peroxide composition can be significantly safer with respect to burning ignition and thermal stability than previous free-flowing, solid compositions of the prior art which contained the same level of the same solid peroxides.

A. Solid Peroxide Component of the Compositions

The solid peroxide component of the invention compositions have melting points above 30° C. and come from the following peroxide classes:

(1) Solid substituted and unsubstituted diacyl peroxides such as dibenzoyl peroxide (m.p., 106°-7° C.), di-(2-methylbenzoyl)peroxide (m.p., 54°-55° C.), di-(methoxybenzoyl)peroxide (m.p., 126° C.), di-(2-methoxycarbonylbenzoyl)peroxide (m.p., 80° C.), di-(2-benzylbenzoyl)peroxide (m.p., 72°-3° C.), di-(4-fluorobenzoyl)peroxide (m.p., 93° C.), di-(3-chlorobenzoyl)peroxide (m.p., 122°-3° C.), di-(4-chlorobenzoyl)peroxide (m.p., 140°-1° C.), di-(2,4-dichlorobenzoyl)peroxide (m.p., 99°-100° C.), dibenzoyl diperoxyadipate (m.p., 93°-4° C.), benzoyl octadecanoyl peroxide (m.p., 78°-9° C.), dilauroyl peroxide (m.p., 41°-2° C.), dihexadecanoyl peroxide (m.p., 67°-8° C.), di(chloroacetyl)peroxide (m.p., 85° C.), and di-(3-carboxypropionyl)peroxide (m.p., 125° C.). These and other solid diacyl peroxides melting above 30° C., can be found in the published art [e.g. D. Swern (editor), Organic Peroxides, Vol. 1, Wiley-Interscience, New York, 1970, Chapter I, "Organic Peroxides and Peroxy Compounds—General Description", O. L. Mageli and C. S. Sheppard, Pages 66&67; and W. Cooper, J.Chem.Soc., 1951, pages 3106-13].

(2) Solid dialkyl peroxydicarbonates such as dibenzyl peroxydicarbonate (m.p., 101°-2° C.), dicyclohexyl peroxydicarbonate (m.p., 46° C.), di-(cis-3,3,5-trimethylcyclohexyl)peroxydicarbonate (m.p., 81°-2° C.), di-(4-t-butylcyclohexyl)peroxydicarbonate (m.p., 91°-2° C.), dibornyl peroxydicarbonate (m.p., 94°-6° C.), di-(2-phenoxyethyl)peroxydicarbonate (m.p., 97°-100° C.), di-n-tridecyl peroxydicarbonate (m.p., 43°-5° C.) and di-n-hexadecyl peroxydicarbonate (m.p., 52° C.). These and other solid dialkyl peroxydicarbonates, melting above 30° C., can be found in the published art e.g. Ref. 17B) [D. Swern (editor), Organic Peroxides, Vol. 1, Wiley-Interscience, N.Y., 1970, Chapter I, "Organic Peroxides and Peroxy Compounds—General Description", O. L. Mageli et al, page 68.]

(3) Solid ketone peroxides such as di-(1-hydroxycyclohexyl)peroxide (m.p., 69°-71° C.), 1-hydroxycyclohexyl-1-hydroperoxycyclohexyl peroxide (m.p., 78° C.), di-(hydroperoxycyclohexyl)peroxide (m.p., 82°-3° C.) and 3,5-dihydroxy-3,5-dimethyl-1,2-dioxolane (m.p., 80°-2° C.).

(4) Solid peroxyesters such as di-t-butyl diperoxyterephthalate (m.p., 121°-2° C.), di-t-butyl diperoxysuccinate (m.p., 53°-4° C.), di-t-butyl diperoxyadipate (m.p., 42°-3° C.), di-t-butyl diperoxyphthalate (m.p., 48° C.), t-butyl peroxy-(3-carboxypropionate) (m.p., 55°-6° C.), t-butyl peroxy-(3-carboxy-2-propenoate) (m.p., 114°-6° C.) and 2,5-dimethyl-2,5-di(benzoylperoxy)hexane (m.p., 118° C.). These and other solid peroxyesters, melting above 30° C., can be found in the published art [e.g., D. Swern (editor), Organic Peroxides, Vol. 1, Wiley-Interscience, N.Y., 1970, Chapter I, "Organic Peroxides and Peroxy Compounds—General Description", O. L. Mageli et al, pages 75 to 78.]

(5) Solid alkyl hydroperoxides such as 2,5-dimethyl-2,5-dihydroxyperoxyhexane (m.p., 104°-5° C.), 2,5-dimethyl-2,5-dihydroxyperoxy-3-hexyne (m.p., 107°-9° C.), 2,7-dimethyl-2,7-dihydroperoxy-3,5-octadiyne (m.p., 95°-7° C.), 1,4-di(1-methyl-1-hydroxyperoxyethyl)benzene (m.p., 60°-2° C.), and 1,3,5,-tri(1-methyl-1-hydroperoxyethyl)benzene (m.p., 138°-40° C.).

(6) Solid dialkyl peroxides such as di-cumyl peroxide (m.p., 39° C.), 1,4-di[1-methyl-1-(t-butylperoxy)ethyl]-benzene (m.p., 79° C.), 1,3-di-[1-methyl-1-(t-butylperoxy)-ethyl]-benzene (m.p., 49° C.), di(isopropyl-cumyl)-peroxide (m.p., 70° C.) and others that can be found in the published art [e.g., D. Swern, Organic Peroxides, Vol. 1, Wiley-Interscience, N.Y., 1970, Chapter I, "Organic Peroxides and Peroxy Compounds—General Description", O. L. Mageli, et al, pages 41 to 48.]

B. Solid Unsubstituted or Alkyl Substituted Benzoic Acid Component of the Compositions The solid unsubstituted or alkyl substituted benzoic acid component of the invention compositions are solids having melting points above 40° C. The substituted benzoic acids can contain one to five alkyl substituents wherein the alkyl substituent contains one to four carbons. Some typical examples include: Benzoic acid (m.p. 122°-3° C.), monomethylbenzoic acids (2-methyl-, m.p. 103°-5° C.; 3-methyl-, m.p. 109°-12° C.; and 4-methyl-, m.p. 180°-2° C.), dimethylbenzoic acids (2,4-di-methyl-, m.p. 127° C.; 2,3-dimethyl-, m.p. 144° C.; 2,5-di-methyl-, m.p. 132° C.; 2,6-dimethyl-, m.p. 116° C.; 3,4-dimethyl-, m.p. 165°-6° C.; and 3,5-dimethyl-, m.p. 166° C.), trimethylbenzoic acids (2,4,5-trimethyl-, m.p. 149.5° C.; 2,3,4-trimethyl-, m.p. 167.5° C.; 2,4,6-trimethyl-, m.p. 152° C.; 2,3,5-trimethyl-, m.p. 127° C.; 2,3,6-trimethyl-, m.p. 105°-6° C.; and 3,4,5-trimethyl-, m.p. 215° C.), pentamethylbenzoic acid (m.p. 210.5° C.), monoethylbenzoic acids (2-ethyl-, m.p. 68° C.; 3-ethyl-, m.p. 47° C.; and 4-ethyl-, m.p. 113° C.), mono-n-propylbenzoic acids (2-propyl-, m.p. 58° C.; and 4-propyl-, m.p. 141° C.), monoisopropylbenzoic acids (2-isopropyl-, m.p. 51° C.; and 4-isopropyl-, 116.5° C.), and 4-t-butylbenzoic acid, (m.p. 164°-5° C.).

C. Optional Dust Suppressants

Suitable optional dust suppressants for the invention compositions are liquids such as mineral spirits or mineral oils having flash points above 100° F., sucrose acetate isobutyrates and liquid plasticizers such as benzyl butyl phthalate, dibutyl phthalate and tricresyl phosphate.

The compositions of typical peroxide formulations of this invention are given in Table I.

TABLE I

Safe, Free-Flowing Peroxide/Unsubstituted or Alkyl Substituted Benzoic Acid Compositions

| Composition | Peroxide, % | Benzoic Acid, % | Optional Dust Suppressant, % |
|---|---|---|---|
| A | Dibenzoyl Peroxide, 50 | Benzoic Acid, 50 | — |
| B | Dibenzoyl Peroxide, 50 | Benzoic Acid, 49.5 | Mineral Oil (MO), 0.5 |
| C | Dibenzoyl Peroxide, 70 | Benzoic Acid, 30 | — |
| D | Dibenzoyl Peroxide, 85 | Benzoic Acid, 15 | — |
| E | Dibenzoyl Peroxide, 85 | Benzoic Acid, 14.5 | MO, 0.5 |
| F | Di-(2-methylbenzoyl) Peroxide, 70 | Benzoic Acid, 30 | — |
| G | Dibenzoyl Peroxide, 60 | 2-Methylbenzoic Acid, 40 | — |
| H | Dibenzoyl Peroxide, 60 | 4-Methylbenzoic Acid, 40 | — |
| I | Di(2-chlorobenzoyl) Peroxide, 50 | Benzoic Acid, 50 | — |
| J | Di-(4-chlorobenzoyl) Peroxide, 50 | Benzoic Acid, 50 | — |
| K | Di-(2,4-dichlorobenzoyl) Peroxide, 50 | Benzoic Acid, 50 | — |
| L | Dilauroyl Peroxide, 50 | Benzoic Acid, 50 | — |
| M | Dihexadecanoyl Peroxide, 50 | Benzoic Acid, 50 | — |
| N | Di-(3-carboxypropionyl) Peroxide, 50 | Benzoic Acid, 50 | — |
| O | Dibenzoyl Peroxide, 50 | 4-t-Butylbenzoic Acid, 50 | — |
| P | Di-(2-phenoxyethyl) Peroxydicarbonate, 50 | Benzoic Acid, 50 | — |
| Q | Di-(4-t-butylcyclohexyl) Peroxydicarbonate, 50 | Benzoic Acid, 50 | — |
| R | Dibenzyl Peroxydicarbonate, 50 | Benzoic Acid, 50 | — |
| S | Di-(3,3,5-trimethylcyclohexyl) Peroxydicarbonate, 50 | Benzoic Acid, 50 | — |
| T | Dicyclohexyl Peroxydicarbonate, 50 | Benzoic Acid, 50 | — |
| U | Dibornyl Peroxydicarbonate, 50 | Benzoic Acid, 50 | — |
| V | Di-n-hexadecyl Peroxydicarbonate, 50 | Benzoic Acid, 50 | — |
| W | Di-(1-hydroxycyclohexyl) Peroxide, 50 | Benzoic Acid, 50 | — |
| X | Di-(1-hydroperoxycyclohexyl) Peroxide | Benzoic Acid, 50 | — |
| Y | 3,5-Dihydroxy-3,5-dimethyl-1,2-dioxolane, 50 | Benzoic Acid, 50 | — |
| Z | Di-t-butyl Diperoxyterephthalate, 50 | Benzoic Acid, 50 | — |
| AA | Di-t-butyl Diperoxysuccinate, 50 | Benzoic Acid, 50 | — |
| AB | Di-t-butyl Diperoxyphthalate, 50 | Benzoic Acid, 50 | — |
| AC | t-Butyl Peroxy-(3-carboxy-2-propenoate), 50 | Benzoic Acid, 50 | — |
| AD | 2,5-Dimethyl-2,5-di(benzoylperoxy)hexane, 50 | Benzoic Acid, 50 | — |
| AE | 2,5-Dimethyl-2,5-dihydroperoxyhexane, 50 | Benzoic Acid, 50 | — |
| AF | 2,5-Dimethyl-2,5-dihydroperoxy-3-hexyne, 50 | Benzoic Acid, 50 | — |
| AG | 1,4-Di-(1-methyl-1-hydroperoxyethyl)benzene, 50 | Benzoic Acid, 50 | — |
| AH | Dibenzoyl Peroxide, 50 | Benzoic Acid, 49 | Sucrose Acetate Isobutyrate, 1% |
| AI | Dibenzoyl Peroxide, 50 | Benzoic Acid, 49 | Tricresyl Phosphate, 1% |

TABLE I-continued

Safe, Free-Flowing Peroxide/Unsubstituted or Alkyl Substituted Benzoic Acid Compositions

| Composition | Peroxide, % | Benzoic Acid, % | Optional Dust Suppressant, % |
| --- | --- | --- | --- |
| AJ | Dibenzoyl Peroxide, 50 | Benzoic Acid, 49 | Benzyl Butyl Phthalate, 1% |
| AK | Di-α-Cumyl Peroxide, 50 | Benzoic Acid, 50 | — |
| AL | 1,3-Di-[1-methyl-1-(t-butylperoxy)ethyl]benzene, 50 | Benzoic Acid, 50 | — |

D. Methods for Preparation of Solid Peroxide Compositions

Several procedures can be employed to prepare the solid, free-flowing peroxide/unsubstituted or alkyl substituted benzoic acid compositions of this invention:

Procedure A

Wetted granular peroxide can be blended or mixed with an appropriate amount of a solid, granular unsubstituted or alkyl substituted benzoic acid and optionally with an appropriate amount of dust suppressant until a uniform mixture is obtained. Then the mixture can be tray dried or dried by other methods known in the art.

Procedure B

To a stirred aqueous slurry of granular peroxide are added an appropriate amount of a solid, granular unsubstituted or alkyl substituted benzoic acid, and optionally, an appropriate amount of dust suppressant. A surfactant can also be optionally added to aid in forming a uniform aqueous slurry. After stirring for about 5 to 10 minutes, the solid is obtained by filtration or centrifugation and the wetted solid mixture is then dried.

Procedure C

To a stirred aqueous slurry of granular peroxide is added an appropriate amount of alkali metal salt of the solid unsubstituted or alkyl substituted benzoic acid or aqueous solution thereof. Optionally, an appropriate amount of surfactant and/or dust suppressant can be added. The mixture is then stirred until uniform and then an appropriate amount of mineral acid is added in order to precipitate the aromatic carboxylic acid. After stirring for about 5 to 10 minutes, the solid mixture is obtained by filtration or centrifugation and is dried. This procedure can also initially employ an alkaline peroxide slurry. However, the product resulting must be water washed in order to remove impurities resulting from formation of the peroxide.

Procedure D

To an aqueous slurry of the granular peroxide, optionally containing a dust suppressant or a surfactant, is added a solution of the unsubstituted or alkyl substituted benzoic acid which employs a water soluble solvent such as acetone. The solid acid precipitates. The resulting slurry is stirred for 5 to 10 minutes and the dried product is obtained by initially filtering or centrifuging followed by drying.

Procedure E

The solid peroxide and the solid unsubstituted or alkyl substituted benzoic acid are dissolved in a common solvent such as acetone. The resulting solution then can either be:

(a) Stripped to give a dry uniform solid mixture or, (b) Added to stirred water in order to coprecipitate the two solid components and thus produce a uniform slurry of the composition. The product can then be isolated as described above.

Procedure F

Granular dry solid peroxide and filler are hand mixed for 15 minutes or until uniform.

The optionally employed surfactant can be any nonionic surfactant such as a nonylphenoxy polyethoxyethanol, anionic surfactant such as an alkali salt of an alkylaryl polyether sulfonate or a cationic surfactant such as an alkyldimethylbenzylammonium halide in which the alkyl group contains 10 to 20 carbons.

The invention peroxide compositions are useful as free-radical initiators in the bulk, emulsion, solution, or suspension polymerization or copolymerization of ethylenically unsaturated monomers at suitable temperatures and pressures. Temperatures of 20° C. to 250° C., preferably 30° C. to 200° C. and peroxide levels (on a pure basis) of 0.005 to 3%, preferably on 0.01 to 1%, by weight based on monomer, are normally employed in these polymerization processes. Ethylenically unsaturated monomers include olefins such as ethylene, propylene, styrene, alphamethylstyrene, chlorostyrene, vinyltoluene, vinyl benzyl chloride, vinyl pyridine and divinylbenzene; diolefins, such as 1,3-butadiene, isoprene and chloroprene; vinyl esters, such as vinyl acetate, vinyl propionate, vinyl laurate, vinyl benzoate and divinyl carbonate; unsaturated nitriles, such as acrylonitrile and methacrylonitrile; acrylic acid, methacrylic acid and their esters and amides, such as methyl, ethyl, n-butyl and 2-ethylhexyl acrylates and methacrylates, and acrylamide and methacrylamide; maleic anhydride; maleic and fumaric acids and their esters; vinyl halo and vinylidene halo compounds, such as vinyl chloride, vinyl bromide, vinyl fluoride, vinylidene chloride and vinylidene fluoride; perhalo olefins, such as tetrafluoroethylene, hexafluoropropylene and chlorotrifluoroethylene; vinyl ethers, such as methyl vinyl ether, ethyl vinyl ether and n-butyl vinyl ether; allyl esters, such as allyl acetate, allyl benzoate, diallyl phthalate, allyl ethyl carbonate, triallyl phosphate, diallyl fumarate and diallyl carbonate; acrolein; methyl vinyl ketone; and mixture thereof.

The solid, free-flowing peroxide/unsubstituted or alkyl substituted benzoic acid compositions of this invention are also useful for the curing of unsaturated polyester resin compositions. Unsaturated polyester resins that can be cured by the compositions of this invention usually consist of an unsaturated polyester and one or more polymerizable monomers. The unsaturated polyesters are, for instance, polyesters as they are obtained by esterifying at least one ethylenically unsaturated di- or polycarboxylic acid, anhydride or acid halide, such as maleic acid, fumaric acid, glutaconic acid, itaconic acid, mesaconic acid, citraconic acid, allylmlaonic acid, allysuccinic acid, tetrahydrophthalic acid and others with saturated or unsaturated di- or polyols, such as ethylene glycol, diethylene glycol, triethylene glycol, 1,2- and 1,3-propanediols, 1,2-, 1,3- and 1,4-butanediols, 2,2-dimethyl-1,3-propanediol, 2-hydroxymethyl-2-methyl-1,3-propanediol, 2-buten-1,4-diol, 2-butyn-1,4-diol, 2,2,4-trimethyl-1,3-pentanediol, glycerol, bisphenol A, mannitol and others. Mixtures of such polyacids and/or mixtures of such polyalcohols may also be used. The unsaturated di- or polycarboxylic acids may be partly replaced by saturated polycarboxylic acids, such as adipic acid, succinic acid, sebacic acid and others and/or by aromatic polycarboxylic acids, such as phthalic acid, trimellitic acid, pryomellic acid, isophthalic acid and terephthalic acid. The acids used may be substituted by groups such as halogen. Examples of such suitable halogenated acids are, for example, tetrachlorophthalic acid, 5,6-docarboxy-1,2,3,4,7,7-hexachlorobicyclo(2.2.1)-2-heptene and others. The other component of the unsaturated polyester resin composition, the polymerizable monomer or monomers, can be preferably ethylenically unsaturated monomers, such as styrene, chlorostyrene, vinyltoluene, divinylbenzene, alphamethylstyrene, diallyl maleate, diallyl phthalate, dibutyl fumarate, acrylonitrile, triallyl phosphate, triallyl cyanurate, methyl acrylate, methyl methacrylate, n-butyl methacrylate, ethyl acrylate and others, or mixtures thereof, which are copolymerizable with said polyesters. A preferred resin composition contains as the polyester component the esterification product of 1,2-propylene glycol (a polyalcohol), maleic anhydride (an anhydride of an unsaturated polycarboxylic acid) and phthalic anhydride (an anhydride of an aromatic dicarboxylic acid) as well as the monomer component, styrene. Temperatures of about 10° C. to 200° C. and peroxide levels of about 0.05% to 5% or more by weight of curable unsaturated polyester resin are normally employed. The unsaturated polyesters described above can be filled with various materials such as sulfur, glass fibers, carbon blacks, silicas, metal silicates, clays, metal carbonates, antioxidants, heat and light stabilizers, sensitizers, dyes, pigments, accelerators, metal oxides, such as zinc oxide, blowing agents, etc.

In addition, the free-flowing solid peroxide compositions of this invention can be employed for vulcanizing natural and synthetic rubbers, for curing of olefin copolymers and terpolymers, such as EPR (ethylene-propylene copolymers) and EPDM (ethylene-propylene-diene terpolymer), for crosslinking of PE (polythylene), ethylene-vinyl acetate copolymers, silicon rubbers, styrene-butadiene rubbers and the like, in the presence or absence of additives and fillers such as sulfur, carbon blacks, silicas, clays, carbonates, antioxidants, heat and light stabilizers, dyes, accelerators, zinc oxide, oils, blowing agents, etc.

The invention peroxide compositions can additionally be employed for the curing of monomers such as diethylene glycol bis(allyl carbonate) (ADC) as well as other diallyl and polyallyl compounds. In these applications 0.1 to 10% or more of the invention composition, based on curable monomer, can be employed.

Other types of unsaturated resins can be cured using the compositions of this invention as curing catalysts. These resins, called unsaturated vinyl ester resins, consist of a vinyl ester resin component and one or more polymerizable monomer components. The vinyl ester resin component can be made by reacting a chloroepoxide such as epichlorohydrin with appropriate amounts of a glycol such as bisphenol A[2,2-di-(4-hydroxyphenyl)propane], in the presence of a base such as sodium hydroxide, to yield a condensation product having terminal epoxy groups derived from epichlorohydrin. Subsequent reaction of the condensation product with polymerizable unsaturated carboxylic acids such as acrylic acid and methacrylic acid, in the presence or absence of acidic or basic catalysts, results in formation of a vinyl ester terminated resin component. Normally styrene is added as the polymerizable monomer component to complete the preparation of the unsaturated vinyl ester resin. Temperatures of about 10° C. to 200° C. and pure peroxide levels of about 0.05% to 5% or more by weight of curable unsaturated vinyl ester resin compositions are normally employed for curing of the unsaturated vinyl ester resins. The unsaturated resin described above can be filled with the materials employed with the unsaturated polyester resin compositions described previously.

DESCRIPTION OF PREFERRED EMBODIMENTS

EXAMPLE I

Preparation of a 50% Dibenzoyl Peroxide/50% Benzoic Acid Composition

A reactor equipped with a high speed stirrer was charged with 200 g of water and 80 g of commercial, wet 78% dibenzoyl peroxide and the mixture was stirred vigorously for an hour at 50° C. The fine wet dibenzoyl peroxide was separated by filtration and was hand mixed with 50 g of finely ground 20 mesh (0.85 mm) benzoic acid and the resulting mixture was passed through a 50 mesh (0.30 mm) screen. Obtained was 116 g of wet product. At 26° C. 100 g of the product was dried for 24 hours to yield 82 g of free-flowing powder which had an assay of 50.5% dibenzoyl peroxide. Preliminary burning tests were carried out on 5 g samples of this product as well as on a commercial sample of 50% dibenzoyl peroxide/50% dicyclohexyl phthalate (DCHP). The results showed that the invention 50% dibenzoyl peroxide/50% benzoic acid composition was significantly more resistant to ignition than was the art 50% dibenzoyl peroxide/50% dicyclohexyl phthalate composition.

EXAMPLE II

Preparation of 70% Dibenzoyl Peroxide/30% Benzoic Acid Compositions

A reactor equipped with a mechanical stirrer was charged with 310 g of commercial wet 78% dibenzoyl peroxide, 1500 g of water, 104 g (0.85 mole) of granular benzoic acid and 72 g (0.90 mole) of 50% aqueous NaOH solution at room temperature. The resulting slurry was acidified by adding 63 g (0.45 mole) of 70% sulfuric acid at room temperature. This resulted in precipitation of the benzoic acid onto the wet dibenzoyl peroxide. The resulting wet composition was separated by filtration and was washed with water. The product was then dried at 26° C. for 24 hours to yield 330 g of dry composition which contained 70.1% dibenzoyl peroxide.

Another sample of 70% dibenzoyl peroxide/30% benzoic acid was prepared as above except that in this case solid sodium benzoate was added to the aqueous dibenzoyl peroxide slurry in place of the combination of benzoic acid and 50% aqueous NaOH solution. The resulting dry composition contained 70.4% by weight of dibenzoyl peroxide.

Preliminary burning tests were carried out on the two above samples of the 70% dibenzoyl peroxide/30% benzoic acid composition and on a commercial sample of a 70% dibenzoyl peroxide/30% dicyclohexyl phthalate composition. The results showed than our invention compositions, containing benzoic acid, exhibited delayed ignition and resistance to burning; whereas, the art composition, containing dicyclohexyl phthalate, ignited immediately upon contact with a flame.

EXAMPLE III

Preparation of Other Dibenzoyl Peroxide/Benzoic Acid Compositions

Employing the acid precipitation processes described in Example II, several other dry free-flowing dibenzoyl peroxide/benzoic acid compositions were prepared which contained 30 to 85% dibenzoyl peroxide and 15 to 70% benzoic acid. The burning characteristics of these invention compositions along with those for 98% dibenzoyl peroxide and for the 50% dibenzoyl peroxide/50% DCHP and the 70% dibenzoyl peroxide/30% DCHP art compositions are summarized in Example III Table.

The burning tests were carried out on 5 gram samples of various dibenzoyl peroxide compositions. In the test a 5 gram sample was placed in an aluminum dish (40 mm in diameter and 12 mm high) and the flame from a gas jet was brought into contact with the composition. The ignition time (the time required for the sample to ignite after contact with the flame), the total burning test time (ignition time plus the burning time) and the flame height were noted.

TABLE
Example III
Burning Test Results (5 gram samples)

| Composition | | Composition Assay, % | Ignit. Time, Secs. | Total Burn, Secs. | Flame Height Ins. |
|---|---|---|---|---|---|
| % Dibenzoyl Peroxide | % Benzoic Acid | | | | |
| 85 | 15 | 85.5 | <1 | 8 | 54 |
| 80 | 20 | 80.7 | <1 | 10 | 48 |
| 75 | 25 | 74.7 | 1 | 32 | 48 |
| 70 | 30 | 70.5 | 2 | 40 | 48 |
| 65 | 35 | 65.8 | 2 | 108 | 42 |
| 60 | 40 | 60.7 | 3 | 133 | 36 |
| 55 | 45 | 55.2 | 4 | 140 | 36 |
| 50 | 50 | 50.6 | 18 | 192 | 30 |
| 45 | 55 | 45.4 | 35 | 185 | 24 |
| 40 | 60 | 40.3 | 48 | 230 | 12 |
| 35 | 65 | 35.1 | 58 | 317 | 12 |
| 30 | 70 | 30.3 | 60 | 320 | 12 |
| % Dibenzoyl Peroxide/ 30% DCHP | | 70.2 | <1 | 21 | 48 |
| % Dibenzoyl Peroxide/ 50% DCHP | | 51.3 | <1 | >300 | 30 |
| % Dibenzoyl Peroxide | | 99.1 | <1 | <1 | 60 |

The results in Example III Table show that the dibenzoyl peroxide/benzoic acid compositions of this invention exhibited delayed ignition and/or reduced burning hazards whereas the art dibenzoyl peroxide compositions and pure dibenzoyl peroxide were considerably more hazardous since they ignited immediately and were more hazardous in burning.

EXAMPLE IV

Preparation of a 50% Dibenzoyl Peroxide/49.5% Benzoic Acid/0.5% Mineral Oil Composition To a reactor equipped with a mechanical stirrer was charged 207 g of water, 76.9 g. of commercial 78% wet dibenzoyl peroxide, 0.4 g of a surfactant*, 59.4 g of 20 mesh (0.85 mm) benzoic acid and an aqueous 10% mineral oil (MO) emulsion that was previously made by mixing 0.6 g of MO with 0.2 g of a surfactant* and 5.2 g of water. The resulting mixture was stirred for 15 minutes at 12° to 15° C., then the product was separated by filtration and the product was washed with water. The product was then spread out in a tray and was allowed to air dry at 20°-25° C. over a period of 24 hours. Obtained was 117 g of the dry formulation, 50% dibenzoyl peroxide/49.5% benzoic acid/0.5% MO. The assay of the product according to the "active oxygen" content was 50.1%. The MO reduced the amount of dusting due to the presence of fine particles of dibenzoyl peroxide and benzoic acid that were in the formulation.

*The surfactant employed was prepared by adding 75 g of a stripped coconut fatty acid mixture (e.g., Ashland's HYDROFOL® ACID 631) to 711 g of aqueous 7.4% posassium hydroxide solution. The mixture was stirred at room temperature until a clear aqueous solution was obtained. A shaker vibration test was carried out on the composition that was produced. A 250 ml graduated cylinder was completely filled with the 50% dibenzoyl peroxide/49.5% benzoic acid/0.5% MO formulation. The top of the cylinder was covered with polyethylene film in order to prevent loss of product during shaking and the filled graduated cylinder was taped vertically to a Tyler Sieve Shaker (Model RX-24, W. C. Tyler, Inc., Mentor, Ohio 44060) and the shaker was turned on. After various periods of shaking the material in the top and in the bottom of the cylinder was assayed for dibenzoyl peroxide content. Example IV Table summarizes the results and shows that the original assay, and the top and bottom assays were

TABLE
Example IV
Shaker Test Results - Assay Uniformities

| Shaking Time, hrs. | Dibenzoyl Peroxide Content, % | | |
|---|---|---|---|
| | Original | Top | Bottom |
| 1.0 | 50.1 | 50.4 | 49.8 |
| 3.0 | 50.0 | 49.7 | 50.0 |
| 6.0 | 50.0 | 49.2 | 50.9 |
| 10.0 | 50.1 | 52.2 | 51.9 | within analytical error of each other. Hence, the 50% dibenzoyl peroxide/49.5% benzoic acid/0.5% MO formulation remained stable with respect to assay uniformity during at least 10 hours of shaking on a Tyler Sieve Shaker.

EXAMPLE V

Preparation of an 85% Dibenzoyl Peroxide/14.5% Benzoic Acid/0.5% MO Composition To a reactor equipped with a mechanical stirrer was charged 280 g of water, 109 g of commercial 78% wet dibenzoyl peroxide, 0.2 g of a surfactant (described in Example IV), 14.5 g of 20 mesh (0.85 mm) benzoic acid and 6 g of an aqueous 10% MO emulsion (described in Example IV). The resulting mixture was stirred for 15 minutes at 12°-15° C., then the product was separated by filtration and the product was washed with water. The product was then spread out on a tray and was allowed to dry at 20°-25° C. over a period of 24 hours. A white free-flowing powder was obtained which contained 85% dibenzoyl peroxide, 14.5% benzoic acid and 0.5% MO. The assay of the product according to "active oxygen" content was 85.3%.

EXAMPLE VI

SPI Exotherms of Various Dibenzoyl Peroxide/Benzoic Acid Compositions

Two unsaturated polyester resin compositions were employed in this example.

Resin Composition A

This unsaturated polyester resin was composed of an unsaturated polyester and styrene monomer. The unsaturated polyester was an alkyd resin made by esterfying the following components.

| Component | Quantity |
|---|---|
| Maleic anhydride | 1.0 mole |
| Phthalic anyhydride | 1.0 mole |

-continued

| Component | Quantity |
|---|---|
| Propylene glycol | 2.2 moles |

To the resulting resin was added 0.013% by weight of hydroquinone inhibitor. The alkyd resin had an Acid No. of 45–50. Seven (7) parts by weight of the above polyester (alkyd resin) was diluted with three (3) parts by weight of monomeric styrene. The resulting unsaturated polyester resin had the following properties:

| a. Viscosity (Brookfield No. 2 at 20 r.p.m.) | 13.08 poise |
|---|---|
| b. Specific gravity | 1.14 |

Curing Procedure

Gelation and cure characteristics of various initiators in the above unsaturated polyester resin were determined using the Standard SPI Exotherm Procedure ("SPI Procedure for Running Exotherm Curves-Polyester Resins", published in the Preprint of the 16th Annual Conference—Reinforced Plastic Division, Society of the Plastics Industry, Inc., February, 1961).

Using the curing procedure described above at 93° C. (200° F.) the 50% dibenzoyl peroxide/49.5% benzoic acid/0.5% MO (A) composition of Example IV, the 85% dibenzoyl peroxide/14.5% benzoic acid/0.5% MO (B) composition of Example V, commercial wet 78% dibenzoyl peroxide and commercial 50% dibenzoyl peroxide/50% dicyclohexyl phthalate (C) were evaluated as curing agents for Resin Composition A. The results are summarized in Example VI Table I and show that the instant invention compositions (A) and (B) cured the unsaturated polyester resin and had activities that were essentially the same as those of art composition (C) and commercial wet 78% dibenzoyl peroxide in Resin Composition A.

TABLE I
Example VI
93° C. SPI Exotherm Data - Resin Composition A

| Dibenzoyl Peroxide Composition | Level* % | Gel, Mins. | Cure, Mins. | Peak Exo., °F. | Barcol Hardness |
|---|---|---|---|---|---|
| A | 1.0 | 2.6 | 3.7 | 411 | 45 |
| B | 1.0 | 2.2 | 3.1 | 403 | 45 |
| C | 1.0 | 2.3 | 3.5 | 415 | 45 |
| 78% Dibenzoyl Peroxide | 1.0 | 2.4 | 3.6 | 413 | 45 |

*As pure dibenzoyl peroxide

Resin Composition B (DERAKANE® 411-45)

This unsaturated polyester resin was a corrosion resistant unsaturated polyester resin that was composed of a vinyl ester resin and styrene monomer. This resin, DERAKANE® 411-45, was produced by the Dow Chemical Company. (see Dow Chemical Company Bulletin, "Derakane Vinyl Ester Resins for Corrosion Resistance", 1975).

The same curing procedure and the same dibenzoyl peroxide compositions as used for curing of Resin Composition A were used for curing of Resin Composition B. The results are summarized in Example VI Table II and again show that the dibenzoyl peroxide compositions of the instant invention, e.g., (A) and (B), cured Resin Composition B and had activities that were essentially the same as those of art composition (C) and commercial wet 78% dibenzoyl peroxide, hence the benzoic acid had no detrimental effect on the efficiency of the peroxide as a curing initiator for unsaturated polyester resins.

TABLE II
Example VI
93° C. SPI Exotherm Data - Resin Composition B

| Dibenzoyl Peroxide Composition | Level*, % | Gel, Mins. | Cure, Mins. | Peak Exo., °F. | Barcol Hardness |
|---|---|---|---|---|---|
| A | 1.0 | 5.6 | 7.3 | 416 | 20–25 |
| B | 1.0 | 5.0 | 6.8 | 415 | 25–30 |
| C | 1.0 | 5.2 | 6.9 | 415 | 20–25 |
| 78% Dibenzoyl Peroxide | 1.0 | 5.5 | 7.3 | 416 | 20–25 |

*As pure dibenzoyl peroxide

EXAMPLE VII

Ignition Times for Various Dibenzoyl Peroxide/Carboxylic Acid Formulations

Several dry free-flowing dibenzoyl peroxide/carboxylic acid formulations were prepared by the procedures described in the previous Examples. Burning ignition times were then determined on these formulations.

TABLE
Example VII
Ignition Times of Various Dibenzoyl Peroxide/Carboxylic Acid Formulations

| Formulation Composition Dibenzoyl Peroxide, % | Filler, % | Filler m.p., °C. | Ignition Time, seconds |
|---|---|---|---|
| 60% | 2-Methylbenzoic Acid, 40% | 103–5 | 28 |
| 60% | 4-Methylbenzoic Acid, 40% | 180–2 | 13 |
| 60% | Benzoic Acid, 40% | 122–3 | 3 |
| 70% | Benzoic Acid, 30% | 122–3 | 2 |
| 70% | Stearic Acid, 30% | 65–67 | <1 |
| 70% | Azelaic Acid*, 30% | 98–102 | <1 |
| 70% | DCHP, 30 | 63–5 | <1 |

*1,9-nonanedioic acid

The results are summarized in Example VII Table and show that unsubstituted or alkyl substituted benzoic acids such as benzoic acid, 2-methylbenzoic acid and 4-methylbenzoic acid caused the formulation to have desirable and safe delayed ignitions whereas the non-aromatic carboxylic acids such as stearic acid and azelaic acid failed to delay ignition of the compositions containing them. The results of this example demonstrate the general usefulness of unsubstituted or alkyl substituted benzoic acids in the practice of this invention.

EXAMPLE VIII

Preparation of Peroxide/Benzoic Acid Formulations

Several room temperature stable solid dialkyl peroxydicarbonates such as di-(2-phenoxyethyl) peroxydicarbonate (A-1) (m.p., 97°–100° C.), di-(4-t-butylcyclohexyl) peroxydicarbonate (A-2) (m.p., 91°–2° C.) and dibenzyl peroxydicarbonate (A-3) (m.p., 101°–2° C.) and the solid dihydroperoxide, 2,5-dimethyl-2,5-dihydroperoxyhexane (A-4) (m.p., 104°–5° C.), in dry granular form were individually hand mixed with equal quantities of dry granular benzoic acid (m.p., 122°–3°) or dicyclohexyl phthalate (DCHP) (m.p., 63°–5° C.). The latter filler, DCHP, has been employed in prior art compositions whereas the former filler, benzoic acid, is employed in the compositions of this invention. Example VIII Table summarizes the burning ignition times for the above compositions and show that the 50% peroxide/50% benzoic acid formulations of this invention resulted in much longer ignition times than the corresponding 50% peroxid/50% DCHP formulations. Hence, unsubstituted or alkyl substituted benzoic acid fillers (e.g., benzoic acid) of the present invention are much safer fillers for peroxides than are prior art fillers (e.g., DCHP).

TABLE

Example VIII
Ignition Times for Various 50% Peroxide/50% Filler Compositions

| Peroxide | Filler | Ignition Time, secs. |
|---|---|---|
| A-1 | Benzoic Acid | 6 |
| A-1 | DCHP | 3 |
| A-2 | Benzoic Acid | 8 |
| A-2 | DCHP | 1 |
| A-3 | Benzoic Acid | 5 |
| A-3 | DCHP | 2 |
| A-4 | Benzoic Acid | 47 |
| A-4 | DCHP | 34 |
| Dibenzoyl Peroxide | Benzoic Acid | 18* |
| Dibenzoyl Peroxide | DCHP | <1* |

*Data from Example III Table

EXAMPLE IX

Preparation of a 70% Di-(2-methylbenzoyl) Peroxide/30% Benzoic Acid Formulation

Employing essentially the same procedure as used in Example V solid free-flowing 70% di-(2-methylbenzoyl) peroxide formulations were prepared in which benzoic acid, an acid filler of this invention, and DCHP, an art filler, were employed. Example IX Table shows that the composition containing benzoic acid gave a longer burning ignition time than did the composition containing the art filler (DCHP).

TABLE

Example IX
70% Di-(2-methylbenzoyl) Peroxide Formulations

| Filler | Filler Melting Point, °C. | Composition Burning Ignition Time, secs. |
|---|---|---|
| Benzoic Acid | 122-3 | 2 |
| DCHP | 63-5 | <1 |

EXAMPLE X

Thermal Stabilities of Dibenzoyl Peroxide/Benzoic Acid Formulations

Several dibenzoyl peroxide/benzoic acid formulations of this invention and several dibenzoyl peroxide/DCHP formulations of the art were stability tested at 50° C., 60° C. and 70° C. Samples containing approximately 10 g of each formulation were placed in ovens at 50° C., 60° C. and 70° C. and the samples were held at these temperatures for various lengths of time. Example X Table summarizes the percent of assay lost for each of these formulations at the ends of the thermal stability tests. The results demonstrate that the dibenzoyl peroxide/benzoic acid formulations of this invention have significantly better thermal stabilities than the art dibenzoyl peroxide/DCHP formulations. The invention formulations lost very little assay when stored at 70° C. whereas one of the art compositions decomposed completely at 70° C. and a second art composition decomposed violently at 70° C. The practicaly implication of these thermal stability data is that the invention dibenzoyl peroxide formulations are safer to process, dry at elevated temperatures during manufacture, ship and store than are the prior art dibenzoyl peroxide/DCHP formulations.

TABLE

Example X
Thermal Stabilities of Various Dibenzoyl Peroxide Formulations

| Formulation Composition Dibenzoyl Peroxide, % | Filler | Storage Temp., C. | Duration hrs. | % Assay Lost |
|---|---|---|---|---|
| 50 | Benzoic Acid, 50 | 50 | 240 | 0.4 |
| 50 | DCHP, 50 | 50 | 240 | 2.4 |
| 50 | Benzoic Acid, 50 | 60 | 240 | 0.8 |
| 50 | DCHP, 50 | 60 | 240 | 100* |
| 50 | Benzoic Acid, 50 | 70 | 16 | 1.4 |
| 50 | DCHP, 50 | 70 | <6 | 100** |
| 70 | Benzoic Acid, 30 | 50 | 120 | 0.1 |
| 70 | DCHP, 30 | 50 | 120 | 2.0 |
| 85 | Benzoic Acid, 15 | 50 | 240 | 3.0 |
| 85 | DCHP, 15 | 50 | 240 | 12.9 |
| 85 | Benzoic Acid, 15 | 60 | 240 | 8.4 |
| 85 | DCHP, 15 | 60 | 48 | 19.1 |
| 85 | DCHP, 15 | 60 | 120 | 100 |
| 85 | Benzoic Acid, 15 | 70 | 6 | 0.5 |
| 85 | DCHP, 15 | 70 | 2 | 100*** |

*Sample decomposed completely and became liquid. After 120 hrs./60° C. % assay lost was 18.4.
**Sample decomposed completely and became liquid.
***Sample exploded and destroyed testing oven after two hours at 70° C.

EXAMPLE XI

Vinyl Chloride Suspension Polymerization with a 50% Di-(2-phenoxyethyl) peroxydicarbonate/50% Benzoic Acid Composition Pure di-(2-phenoxyethyl) peroxydicarbonate (A-1) and the 50% A-1/50% benzoic acid composition of this invention were evaluated as polymerization initiators at 55° C. for vinyl chloride suspension polymerizations in a PVC reactor. The level of initiator that was employed on a pure basis was 0.10 parts per hundred based on vinyl chloride monomer and the pH of the suspension was about 6.5. The experimental procedure employed is described below.

Suspension Polymerizations

Polymerizations of vinyl chloride in suspension were carried out in a 1.5 liter reactor, which was designed and instrumented such that the polymerization could be monitored calorimetrically. The reactor was immersed in a water bath, maintained 0.5° C. above the desired reaction temperature, thus preventing any heat loss to the surroundings. The heat produced from the exothermic polymerization, plus the heat passed into the reactor from the water bath, was removed by the passage of cooling water through internal coils in the reactor. Thus the temperature was kept constant. The flow rate of the cooling water, and the temperature difference between entrance and exit streams were monitored, hence a continuous recording of heat removed (cal. $min^{-1}$) was obtained.

The pressure in the reactor was also continuously monitored. At about 70% conversion of monomer to polymer, the monomer in the vapor phase became depleted and the pressure fell. Thus, from a knowledge of the point of 70% conversion, and heat of polymerization of vinyl chloride (23 kcal/mole) it was possible to calculate the "background count" in the calorimetric recording, this background being due to heat flow from the water bath to the reactor. By substraction, the true rate of polymerization (cal. min$^{-1}$), as a function of time, was obtained.

| Suspension System Used pH$_2$ 6.5) | |
|---|---|
| 1% solution of Aerosol MA 80%* | 42 ml |
| 1% solution of Methocel F 50** | 168 ml |
| Triply distilled water | 469 ml |

*Surfactant made by American Cyanamid Co. (sodium dihexyl succinate)
**Hydroxypropyl methyl cellulose polymer made by Dow Chemical
Note: pH of the aqueous phase was measured at ambient temperatures, 22° C., using a standard pH meter.

Example XI Table summarizes the time that was required for reaching the pressure drop (ca. 70% conversion of vinyl chloride monomer to polymer) when pure A-1 and the 50% A-1/50% benzoic acid composition were employed.

TABLE
Example XI
Vinyl Chloride Suspension Polymerizations
at 55° C., pH$_2$ 6.5

| Initiator Composition | Level, phm* | Time to Pressure Drop ( 70% Conversion), Mins. |
|---|---|---|
| Pure A-1 | 0.10 | 340 |
| 50% A-1/50% Benzoic Acid | 0.10 | 340 |

*Parts of pure peroxide per hundred monomer

The results show that the 50% A-1/50% benzoic acid composition of this invention had the same efficiency (on a pure basis) as pure A-1. Hence, the safe composition of this invention, such as 50% A-1/50% benzoic acid, can be employed as free-radical initiator compositions for polymerizing monomers, such as vinyl chloride, to polymers, hence benzoic acid had no detrimental effect on the efficiency of the peroxide as an initiator for vinyl monomer polymerizations.

EXAMPLE XII

Curing of Diethylene Glycol Bis(allyl Carbonate) with 85% Dibenzoyl Peroxide/15% Benzoic Acid, 85% Dibenzoyl Peroxide/15% Dicyclohexyl Phthalate and 98% Dibenzoyl Peroxide Compositions Diethylene glycol bis(allyl carbonate), ADC, is a cross-linkable monomer, which then cured with free-radical curing agents, is finding increasing use in optical applications (safety glasses, safety shields, etc.)

The only free-radical catalysts that have been found to satisfactorily cure ADC are dry 98% dibenzoyl peroxide and the low molecular weight peroxydicarbonates, diisopropyl peroxydicarbonate and di-sec-butyl peroxydicarbonate. The latter initiators require refrigerated storage and care in handling whereas the former 98% dibenzoyl peroxide, although stable, requires extremely careful handling owing to its explosive burning hazard. Although commercial wet dibenzoyl peroxide formulations containing 22 to 33% water are resistant to burning the water in them causes problems such as gas bubbles and surface imperfections when these wet dibenzoyl peroxide products are used for curing of ADC lenses.

Various dry dibenzoyl peroxide compositions were employed for curing ADC. These compositions were an instant invention composition consisting of 85% dibenzoyl peroxide and 15% benzoic acid and art compositions such as dry 98% dibenzoyl peroxide and an 85% dibenzoyl peroxide/dicyclohexyl phthalate formulation.

Curing Procedure

In the curing tests 0.125 inch thick lenses were cast in a curing cell consisting of two glass plates separated by a Tygon ® (trademark of the Norton Co., a clear, flexible vinyl acetate/vinyl chloride copolymer) gasket. The glass plates were held in contact with the Tygon ® gasket by means of four spring binder clips, one on each edge of the 4 inch×4 inch cell. The catalyzed ADC monomer was prepared by dissolving 1.772 g of dibenzoyl peroxide (on a pure basis) in 50 g of ADC. The catalyzed ADC was injected into the cell by means of a syringe. A second syringe was used to allow the displaced air to escape.

The castings were polymerized in a hot air oven using the following time/temperature profile:

| Temperature (°C.) | Time, mins. |
|---|---|
| 78 | 45 |
| 82 | 15 |
| 84 | 15 |
| 86 | 30 |
| 88 | 30 |
| 90 | 30 |
| 92 | 15 |
| 94 | 15 |
| 96 | 15 |
| 100 | 15 |
| 102 | 15 |
| 104 | 15 |
| 106 | 15 |
| 108 | 15 |
| 110 | 15 |
| 112 | 15 |
| 115 | 75 |

Thus, the total cure time was 6½ hours. At the end of this period the cells were removed from the oven and allowed to cool to ambient temperature. The Barcol hardness and appearance of each casting were then determined. Example XII Table summarizes the result of curing of ADC by the dibenzoyl peroxide compositions.

TABLE
Example XII
Curing of ADC with Dibenzoyl Peroxide Compositions
(1.772g pure Dibenzoyl Peroxide/50g ADC)

| Dibenzoyl Peroxide Composition | Hardness | Appearance |
|---|---|---|
| Dry 98% Dibenzoyl Peroxide | 45–48 | Good |
| 85% Dibenzoyl Peroxide/15% Benzoic Acid | 41–45 | Good |
| 85% Dibenzoyl Peroxide/15% Dicyclohexyl Phthalate | 17–23 | Poor* |

*Uneven surface due to premature release from the glass surface of the mold.

The instant invention composition (85% dibenzoyl peroxide/15% benzoic acid) cured the resin about as well as did dry 98% dibenzoyl peroxide. On the other hand the art composition, 85% dibenzoyl peroxide/15% dicyclohexyl phthalate, gave a poor quality lens as judged by hardness and surface quality. These results demonstrate that the safe dibenzoyl peroxide/benzoic acid compositions of this invention can be used for curing of ADC in place of hazardous dry 98% dibenzoyl peroxide whereas the art dibenzoyl peroxide/dicyclohexyl phthalate formulations cannot be used. Since dry 98% dibenzoyl peroxide is forbidden in transport in most of the countries of the world, the above results represent a significant advance in the art. They demonstrate that procedures of ADC lenses throughout the world can safely use the safe and stable dibenzoyl peroxide/benzoic acid compositions of this invention in place of the hazardous dry 98% dibenzoyl peroxide and the hazardous and the thermally unstable low molecular weight liquid peroxydicarbonates for curing of ADC.

EXAMPLE XIII

50% Dialkyl Peroxide/50% Filler Formulations

Two dialkyl peroxides and two fillers were used to prepare four 50% dialkyl peroxide/50% filler compositions. The dialkyl peroxides used were di-cumyl peroxide (A-5) (m.p., 39° C.) and 1,3-di-[1-methyl-1-(t-butyl-peroxy)ethyl]benzene (A-6) (m.p., 70° C.) whereas the fillers were benzoic acid (m.p., 122°-3° C.) and dicyclohexyl phthalate (DCHP) (m.p., 63°-5° C.). The latter filler, DCHP, has been employed in prior art compositions whereas the former filler, benzoic acid, is employed in the compositions of this invention. The compositions were prepared by handmixing of equal parts of powdered dialkyl peroxide and powdered filler until the compositions were uniform. The resulting 50% peroxide/50% filler compositions as well as pure A-5 and pure A-6 were evaluated in burning tests on 5 gram portions of each sample. The maximum flame heights of each composition were noted and the results are summarized in Example XIII Table.

TABLE
Example XIII
Burning Tests on 50% Dialkyl Peroxide/50% Filler Compositions

| Dialkyl Peroxide, % | | Maximum Flame Height, ins. |
|---|---|---|
| A-5, 50 | Benzoic Acid, 50 | 10–12 |
| A-5, 50 | DCHP, 50 | 24 |
| A-5, 100 | None | 36–48 |
| A-6, 50 | Benzoic Acid, 50 | 14–16 |
| A-6, 50 | DCHP, 50 | 28–30 |
| A-6, 100 | None | 36 |

The results show that both fillers (benzoic acid and DCHP) reduced the flame height of the peroxide burn, hence, both fillers reduced the explosive burning hazard of pure A-5 and A-6. However, the compositions of this invention (i.e., 50% A-5/50% benzoic acid and 50% A-6/50% benzoic acid) were significantly more effective in reducing the flame height and explosive burning hazard than were the conpositions which used the art filler (i.e., 50% A-5/50% DCHP and 50% A-6/50% DCHP).

EXAMPLE XIV

Preparation of Various 50% Dibenzoyl Peroxide/Solid Filler Compositions

The various fillers employed in this example were ground to pass through a 30 mesh screen. Then equal portions of granular dry dibenzoyl peroxide and the solid filler were hand mixed and blended over a period of 15 minutes. The resulting mixtures were then passed through a 20 mesh screen. Example XIV Table summarizes the compositions of these mixtures.

TABLE
Example XIV
50% Dibenzoyl Peroxide/Solid Filler Compositions

| Composition | Filler | % Dibenzoyl Peroxide |
|---|---|---|
| A | Benzoic Acid | 51.1 |
| B | Stearic Acid | 50.4 |
| C | Lauric Acid | 50.9 |
| D | Decanoic Acid | 51.2 |
| E | Azelaic Acid | 49.8 |
| F | Salicylic Acid | 50.8 |
| G | Phthalic Acid | 50.6 |
| H | Dicyclohexyl Phthalate (DCHP) | 50.9 |

EXAMPLE XV

Burning Tests on Various 50% Dibenzoyl Peroxide/Solid Filler Compositions

Burning tests were carried out on 5 gram samples of the various 50% dibenzoyl peroxide compositions of Example XIV. In the tests a 5 gram sample was placed in an aluminum dish (40 mm in diameter and 12 mm high) and a flame from a gas jet was brought into contact with the composition. The ignition time (the time required for the sample to ignite after contact with the flame), the active burning time (the time required for peroxidic burning) and the flame height were noted. The results of these tests are summarized in Example XV Table and show that composition A, a composition of the instant invention, had the best overall burning safety characteristics.

TABLE
Example XV
Burning Tests - 50% Dibenzoyl Peroxide/Solid Filler Compositions

| Composition | Filler | Ignition Time, secs | Active Burning, secs | Flame Height, inches |
|---|---|---|---|---|
| A | Benzoic Acid | 5 | 8 | 6 to 7 |
| B | Stearic Acid | 3 | 5 | 12 to 14 |
| C | Lauric Acid | 2 | 5 | 12 to 14 |
| D | Decanoic Acid | 2 | 8 | 12 to 14 |
| E | Azelaic Acid | 1 | 3 | 16 to 18 |
| F | Salicylic Acid | 10 | 1 | 24 to 26 |
| G | Phthalic Acid | 1 | 2 | 18 to 20 |
| H | Dicyclohexyl Phthalate | 1 | 2 | 16 to 18 |
| | Pure Dibenzoyl Peroxide* | <1 | <1 | 60 |

*Data from Example III Table

Although the 50% dibenzoyl peroxide/salicyclic acid composition had a longer ignition time (10 secs vs 5 secs) its actual burning characteristics were much more hazardous as judged by a short active burning time (1 sec vs 8 secs) and a high flame height (24 to 26 inches vs 6 to 7 inches). All the other art 50% dibenzoyl peroxide/solid filler compositions in Example XV Table were significantly less safe with respect to burning hazards than was invention composition A. It should be noted that the ignition time for composition A (5 secs) differs considerably from that (18 secs) of a comparable composition in Example III. The difference in ignition times is attributed to the different methods that were used to prepare the two samples of the 50% dibenzoyl peroxide/benzoic acid compositions. Composition A of this example was prepared by a simple mixing technique whereas Example III employed an acid precipitation technique for preparations of the 50% dibenzoyl peroxide/benzoic acid composition. The acid precipitation technique appears to better coat the dibenzoyl peroxide particles with benzoic acid and thus imparts better protection from the flame.

EXAMPLE XVI

82° C. SPI Exotherms of Various 50% Dibenzoyl Peroxide/Solid Filler Compositions

The unsaturated polyester resin and the curing procedure described in Example VI were employed in this example. The temperature used was 82° C. Pure dibenzoyl peroxide and invention composition A and art compositions F and G of Example XIV were employed as curing catalysts in this example. The catalyst levels employed were equivalent to 1% pure dibenzoyl peroxide in each case. The results of curing of the unsaturated polyester resin at 82° C. (180° F.) are summarized below in Example XVI Table.

TABLE
Example XVI
82° C. (180° F.) SPI Exotherm Data

| Filler | Composition* | Composition Solubility Rating** | Gel, Mins | Cure, Mins | Peak Exo. °F. | Barcol Hardness |
|---|---|---|---|---|---|---|
| Benzoic Acid | A | 2 | 4.4 | 5.8 | 398 | 40–45 |
| Salicylic Acid | F | 3 | 6.8 | 8.9 | 387 | 35–45 |
| Phthalic Acid | G | 4 | 5.7 | 7.7 | 394 | 35–45 |
| None | Pure Dibenzoyl Peroxide | 1 | 5.1 | 6.7 | 396 | 40–45 |

*Of Example XIV
**Solubility in the unsaturated resin:
1 Rating - Best
4 Rating - Poorest The results show that invention composition A was significantly more active than were art compositions F and G as judged by more rapid gel and cure times and also show that invention composition A gave a more uniform cure since the hardness rating covered a narrower range (40–45) then did the cures for the art compositions F and G (Barcol hardness ratings of 35–45). Example XVI Table also shows that invention composition A had significantly better solubility in the unsaturated polyester resin than did art compositions F and G. This is an important consideration in curing of unsaturated polyester resins commercially since slow rates of solution of the solid catalyst composition in the resin results in decreased rates of production of cured pieces. Hence, production costs would increase significantly if slow dissolving at compositions F and G were used in place of invention composition A.

EXAMPLE XVII

Thermal Stabilities of Various 50% Dibenzoyl Peroxide/Solid Filler Compositions

The thermal stability test procedure that was employed in Example X was used in this example. The 50% dibenzoyl peroxide compositions of Example XIV were stability tested at 50° C. for 10 days. Invention composition A and art composition F (salicylic acid filler) were additionally stability tested at 60° C. The results of these thermal stability tests are summarized in Example XVII Table.

TABLE
Example XVII
Thermal Stabilities - 50% Dibenzoyl Peroxide Compositions

| Composition | Filler | Temp. °C. | Time, days | % of Assay lost |
|---|---|---|---|---|
| A | Benzoic Acid | 50 | 10 | 2.3 |
| B | Stearic | 50 | 10 | 100 |
| C | Lauric Acid | 50 | 10 | 100 |
| D | Decanoic Acid | 50 | 10 | 100 |
| E | Azelaic Acid | 50 | 10 | 13.8 |
| F | Salicylic Acid | 50 | 10 | 5.1 |
| G | Phthalic Acid | 50 | 10 | 3.2 |
| H | DCHP | 50 | 10 | 100 |
| A | Benzoic Acid | 60 | 5 | 0.4 |
| F | Salicylic Acid | 60 | 5 | 7.9 |

The results show that invention composition A was significantly more thermally stable than were the art 50% dibenzoyl peroxide/solid filler compositions. The art compositions (e.g., U.S. Pat. No. 2,453,070) which employed fatty acids such as steric acid, lauric acid and decanoic acid completely decomposed at 50° C. for 10 days. The same was true of the art composition containing DCHP (e.g., U.S. Pat. No. 3,538,011). The 50% dibenzoyl peroxide/solid filler compositions containing aromatic carboxylic acids (benzoic acid, salicylic acid and phthalic acid) were significantly more stable than were those compositions containing fatty acids, however, amongst these compositions invention composition A was significantly more stable than art composition F (salicylic acid) and more stable than art composition G (phthalic acid) (e.g., U.S. Pat. Nos. 2,453,070 and 2,453,071).

The results of burning tests, thermal stability tests, curing tests and polymerization efficiency tests show that the invention compositions are attractive in all of these respects whereas the art compositions are unattractive in one or more of these respects.

What is claimed is:

1. A solid, dry, free-flowing peroxide/unsubstituted or alkyl substituted benzoic acid composition consisting essentially of:
   40 to 85% by weight of a solid peroxide having a melting point above 30° C. and selected from the group consisting of substituted or unsubstituted diacyl peroxides, dialkyl peroxydicarbonates, dialkyl peroxides, and alkyl hydroperoxides,
   15 to 60% by weight of a solid unsubstituted or substituted benzoic acid wherein the substituent is an alkyl of 1 to 4 carbons, and
   0.0 to 2.0% by weight of a dust suppressant.

2. The solid peroxide composition of claim 1 wherein the solid peroxide is selected from the group consisting of dibenzoyl peroxide, di-(2-methylbenzoyl)peroxide, di-(2-phenoxyethyl)peroxydicarbonate, di-(4-t-butylcyclohexyl)peroxydicarbonate, dibenzyl peroxydicarbonate, 2,5-dimethyl-2,5-dihydroperoxyhexane, di-cumyl peroxide, and 1,3-di[1-methyl-1-(t-butylperoxy)ethyl]-benzene.

3. The solid peroxide composition of claim 2 wherein the solid unsubstituted or substituted benzoic acid is selected from the group consisting of benzoic acid, 2-methylbenzoic acid, and 4-methylbenzoic acid.

4. The solid peroxide composition of claim 1 wherein the dust suppressant is 0.5% mineral oil.

5. The solid peroxide composition of claim 1 of 85% of dibenzoyl peroxide and 15% of benzoic acid.

6. The solid peroxide composition of claim 1 of 50% of dibenzoyl peroxide, 49.5% of benzoic acid, and 0.5% of mineral oil.

* * * * *